United States Patent

[11] 3,624,095

[72] Inventors Robert H. Poirier
  Columbus, Ohio;
  Bernard W. Fromm, Edgewood; Edward J.
  Poziomek, Edgewood; John A. Stein,
  Parkville; David N. Kramer, Stevenson,
  Md.
[21] Appl. No. 223,309
[22] Filed Sept. 11, 1962
[45] Patented Nov. 30, 1971
[73] Assignee The United States of America as
  represented by the Secretary of the Army

[54] 4-CYANOFORMYL-1-ALKYL PYRIDINIUM
  HALIDE OXIME AND ITS DERIVATIVES
  6 Claims, No Drawings
[52] U.S. Cl. .................................................. 260/294.9,
  252/408
[51] Int. Cl. ................................................. C07d 31/46

[50] Field of Search .......................................... 260/294.9

[56] References Cited
  UNITED STATES PATENTS
3,209,008  9/1965  Poziomek et al. ............  260/294.9

Primary Examiner—Leland A. Sebastian
Attorneys—George Renehan and Edward J. Kelly CLAIM: 1. Compounds having the formula

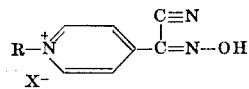

where R is an alkyl group of 1 to 4 carbon atoms and X is selected from the group consisting of $Cl^-$, $Br^-$ and $I^-$.

4-CYANOFORMYL-1-ALKYL PYRIDINIUM HALIDE OXIME AND ITS DERIVATIVES

The invention described herein may be manufactured and used by or for the Government of the United States of America for governmental purposes without the payment to us of any royalty thereon.

This invention is directed to new chemical compounds which are useful as colorimetric detectors for phosphorus cholinesterase inhibitors.

Various oximes have been used in the past to detect the "G" agents as is shown by U.S. Pat. Nos. 2,865,719; 2,867,509; 2,926,072; and 2,929,719. We have discovered a new series of compounds which will react with phosphorus compounds of the type disclosed in U.S. Pat. No. 3,014,943 and British Pat. No. 797,603 to give an almost instantaneous color change from orange, yellow to blue followed by a red fluorescent color under ultraviolet light.

These compounds have the general formula:

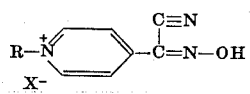

where R is a lower alkyl group and X is a chlorine, bromine, or iodine radical, and the general formula:

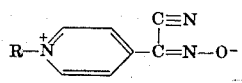

where R is the same as above.

The compound of the first formula can be prepared from 4-picolyl chloride ($\alpha$-chloro-4-picoline) by adding it to sodium cyanide in an alcohol to obtain 4-pyridyl acetonitrile. This is followed by an isonitrosation reaction with alkyl nitrile to obtain $\alpha$-isonitroso-4-pyridylacetonitrile. When this product is quaternized with an alkyl halide in an alcohol, the compounds are obtained.

We have further found that compounds of the first formula can be reacted with an excess amount of bases such as potassium xanthogenate, sodium ethoxide, sodium methoxide, sodium hydroxide and concentrated ammonium hydroxide, to produce compounds of the second group.

It was also found that whereas compounds of the first group detect only compounds of the type disclosed in the above United States and British patents, with the addition of a strong base such as potassium xanthogenate the selectivity of these compounds were expanded to detect one of the "G agents", i.e., ethyl dimethylphosphoramide cyanidate or GA. All these compounds are stable compounds (especially to lights) that can be used in paints, powders, crayons and spray detector formulations in a manner well known in the art.

EXAMPLE I

A slurry of 60 g. of sodium cyanide in 60 ml. of water and 300 ml. of ethyl alcohol was prepared at room temperature. 4-picolyl chloride hydrochloride was added to this slurry portionwise until a total of 49.2 g. were added. After the mixture was stirred at room temperature overnight, the salts were removed by filtration, and the filtrate was concentrated under reduced pressure. The concentrate was poured into ice water, and the mixture was extracted with portions of chloroform totaling nearly 500 ml. The chloroform layer was washed with water to remove most of the intensely colored impurity, dried over anhydrous sodium sulfate and distilled under reduced pressure. In this manner 11.0 g. of 4-pyridylacetonitrile was collected as a colorless oil that solidified in the receiver, with a freezing point of 42.5° C. The product slowly acquired a pinkish color upon standing at room temperature.

To an ice cold solution of 19.5 g. of n-butyl nitrite in 150 ml. of ethanol to which 4.35 g. of metallic sodium had been added, 15.2 g. of 4-pyridylacetonitrile in 30 ml. of ethanol was added dropwise. The sodium salt of the isonitrosated product soon began to separate as a yellow powdery solid. After the reaction mixture had been stirred in the cold for 2 hours, the solid was removed by filtration, rinsed with ethanol and dried in a vacuum oven. The yield of salt was 15.3 g. By evaporating the filtrate to dryness, redissolving the residue in water and acidifying the solution with acetic acid, there separated 9.4 g. of free $\alpha$-isonitroso-4-pyridylacetonitrile as a pinkish white colored solid. The pink colored impurity was readily removed by treatment with activated charcoal of a warm ethanolic solution of the crude product. Nearly pure white needles of $\alpha$-isonitroso-4-pyridylacetonitrile, m.p. 278°–279° C. then separated upon cooling the ethanol solution.

A slurry of 14.0 g. of $\alpha$-isonitroso-4-pyridylacetonitrile in 150 ml. of methanol containing 50 ml. of methyl iodide was refluxed for 32 hours whereupon the isonitroso compound slowly dissolved forming a reddish solution. The methanol and excess methyl iodide were evaporated, thus leaving 29.6 g. of reddish-orange solid. Recrystallization of the crude product from a mixture of 50 ml. of ethanol and 150 ml. of benzene yielded 23.25 g. of 4-cyanoformyl-1-methyl-pyridinium iodide oxime. The product consists of yellowish-orange needles m.p. 172°–173° C. (dec.). Recrystallization from an ethyl alcohol benzene mixture raised the melting point to 180.5°–181° C. (dec.). However, the crystals retained approximately one-half mole of benzene even after drying at 50° C.

Calculated for $C_8 H_8 I N_3 0.\frac{1}{2} C_6 H_6$: C,40.25; H,3.36; I,38.7
Found: C,39.6; H,3.5; I,39.6

EXAMPLE II

To 19.5 g. (0.07 mole) of 4-cyanoformyl-1-methyl-pyridinium iodide oxime dissolved in the minimum amount of ethanol was added at 5°–10° C. an equimolar solution of freshly prepared sodium ethoxide. In 30 seconds a red precipitate formed. The mixture was filtered after 15 minutes to give 10.1 g. of 4-cyanoformyl-1-methyl-pyridinium oximate, a crystalline dusty rose precipitate of m.p. 263°–265° (dec.).

Calculated for $C_8 H_7 N_3 O$: C, 59.6; H,4.4; N,26.1
Found: C,59.9; H,4.5; N,25.7

EXAMPLE III

To a mixture of 3.0 g. (0.019 mole) of 4-cyanoformyl-1-methyl-pyridinium oximate in 50 ml. of methanol was added an equimolar amount of aqueous hydrogen chloride. The compound went into solution immediately. Ether was then added to give a yellow oil. The oil was dissolved in methanol. Upon the addition of ether to the methanol solution, a pale yellow solid precipitated out. After purification of this solid by refluxing a methanol solution of it with activated charcoal and reprecipitation with ether, 1.3 g. of 4-cyanoformyl-1-methyl-pyridinium chloride oxime, a colorless solid m.p. 229°–233° C. (dec) was obtained.

Calculated for $C_8 H_8 N_3 O Cl.\frac{1}{3} H_2O$ C,47.5; H,4.2; N,20.7
Found: C,47.8; H, 4.0; N,20.6

EXAMPLE IV

To a mixture of 1.9 g. (0.012 mole) of 4-cyanoformyl-1-methyl-pyridinium oximate in 50 ml. of methanol was added fuming hydrogen bromide dropwise until a complete solution was effected. Subsequently, 1.35 g. of the product, 4-cyanoformyl-1-methyl-pyridinium bromide oxime, a colorless solid, m.p. 247°–252° C., was isolated and purified in a manner similar to the method described in example III.

Calculated for $C_8 H_8 Br N_3 O$: C,29.6; H,3.3; Br 33.3
Found: C,40.1; H,3.4; Br,32.9

In the foregoing examples, only the use of methyl halides have been illustrated. It is to be understood that this invention also contemplates the use of ethyl, n-propyl and n-butyl halides.

The compounds of group II are interesting in that they apparently resonate between the following forms:

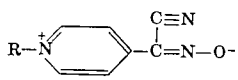

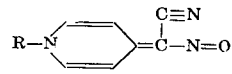

This is confirmed by ultraviolet absorption spectra and by analogy to other zwitter-ion type compounds. The pyridinium oximate structure is the major contributor to the ground state structure of the molecule. Additionally, ultraviolet and visible absorption, spectra in various organic solvents show that intramolecular charge-transfer complexes exist in this class of compounds.

We claim:

1. Compounds having the formula

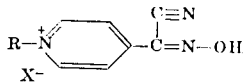

Swhere R is an alkyl group of one to four carbon atoms and X is selected from the group consisting of Cl$^-$, Br$^-$ and I$^-$.

2. Compounds having the formula

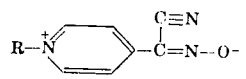

Swhere R is an alkyl group of one to four carbon atoms.

3. 4-cyanoformyl-1-methyl-pyridinium iodide oxime.
4. 4-cyanoformyl-1-methyl-pyridinium oximate.
5. 4-cyanoformyl-7-methyl-pyridinium chloride oxime.
6. 4-cyanoformyl-1-methyl-pyridinium bromide oxime.

* * * * *